United States Patent
Taylor

[11] Patent Number: 5,890,795
[45] Date of Patent: Apr. 6, 1999

[54] OPTICAL MEANS FOR ANNULAR ILLUMINATION OF A SPOT

[75] Inventor: Nicholas John Taylor, Harrow Weald, United Kingdom

[73] Assignee: Eastman Kodak Company, Rochester, N.Y.

[21] Appl. No.: 54,671

[22] Filed: Apr. 3, 1998

Related U.S. Application Data

[62] Division of Ser. No. 374,678, Jan. 25, 1995, Pat. No. 5,772,313.

[30] Foreign Application Priority Data

Jul. 31, 1992 [GB] United Kingdom ................. 92016333

[51] Int. Cl.$^6$ ....................................................... F21V 7/08
[52] U.S. Cl. ........................... 362/302; 362/304; 362/346
[58] Field of Search ............................. 362/33, 298, 301, 362/302, 303, 304, 305, 346, 804; 359/387

[56] References Cited

U.S. PATENT DOCUMENTS

| | | | |
|---|---|---|---|
| 1,699,108 | 1/1929 | Halverson, Jr. | 362/304 |
| 2,157,437 | 5/1939 | Shipley, Jr. | 359/387 |
| 3,825,322 | 7/1974 | Mast | 350/236 |
| 4,277,821 | 7/1981 | Sassmannshausen | 362/299 |
| 4,389,701 | 6/1983 | Phillips | 362/308 |
| 4,422,135 | 12/1983 | McCamy | 362/346 |
| 4,578,575 | 3/1986 | Roos | 362/804 |
| 4,734,829 | 3/1988 | Wu et al. | 362/601 |
| 4,747,030 | 5/1988 | Offner et al. | 362/302 |
| 4,959,757 | 9/1990 | Nakata | 362/304 |
| 5,406,462 | 4/1995 | Fallahi et al. | 362/304 |

FOREIGN PATENT DOCUMENTS

| | | |
|---|---|---|
| 0189027 | 1/1986 | European Pat. Off. . |
| 3504366 A1 | 2/1985 | Germany . |
| 0169889 | 7/1989 | Japan ..................... 362/299 |
| 2191572 A | 5/1986 | United Kingdom . |

OTHER PUBLICATIONS

Applied Optics, vol. 7, No. 10, 15 May 1978, pp. 1532–1536, Rioux et al,"Linear, Annular, and Radial Focusing with Axicons and Applications to Laser Machining."

Japanese abstract, "Irradiating Method for Laser;" vol. 7. No. 25, (M–190) (1170)02 Feb. 1983.

Primary Examiner—Alan Cariaso
Attorney, Agent, or Firm—Clyde E. Bailey, Sr.

[57] ABSTRACT

An optical system operable to focus an annular beam of light onto a spot 16 comprises a paraboloidal reflector 10 with a lamp 12 at its focus, a coaxial annular convex lens 13 and a coaxial internally silvered conical mirror 15. A parallel beam of light formed by reflection by the reflector 10 of light from the lamp 12, if formed into a convergent annular beam by the lens 13 and reflected by the mirror 15 which is located between the lens 13 and its focus so that it converges to the spot 16.

1 Claim, 1 Drawing Sheet

OPTICAL MEANS FOR ANNULAR ILLUMINATION OF A SPOT

This application is a divisional of Ser. No. 08/374,678 filed Jan. 25, 1995 now U.S. Pat. No. 5,772,313.

FIELD OF THE INVENTION

This invention relates to an optical system operable to focus an annular beam of light onto a spot.

BACKGROUND OF THE INVENTION

In reflection densitometry there is often a requirement to illuminate a sample at 45° with light of a narrow beam width, see International Standards Organization ISO Standard 5/4 "Geometric Conditions for Reflection Density". This ideally takes place over a full 360° cone to ensure that the orientation of directionally reflective materials does not effect the resulting measurement.

If an optical system for forming a narrow annular beam converging at 45° onto a spot on a sample to illuminate that spot is formed substantially as is described in GB-A-2191572 or, alternatively, comprises a lamp mounted at the center of the reflective surface of a paraboloidal reflector so as to produce a substantially parallel beam of light, a disc mounted co-axially with the axis of the paraboloidal reflector in the path of the parallel beam of light so as to restrict that beam such that the light that passes it is an annular, parallel beam of light co-axial with the axis of the reflector, and a simple verging lens mounted co-axially with the axis of the paraboloidal reflector on the other side of the disc remote from the paraboloidal reflector whereby the annular parallel beam is caused to converge and focus on the spot which is on the axis of the paraboloidal reflector, the required lens must have a large focal ration (f/no). This is difficult to achieve and, in addition, there is little space available between the lens and the sample to house the necessary detector which senses light reflected by the sample perpendicular to its plane.

SUMMARY OF THE INVENTION

An object of this invention is to provide an optical system which more easily achieves the desired result than is the case when a simple converging lens is used and which provides adequate space for accommodation of a detector operable to sense the light reflected perpendicular to the sample plane.

According to this invention there is provided an optical system operable to focus an annular beam of light onto a spot, the system comprising a light source, optical means operable to form light emitted by the light source into a convergent annular beam and convergent reflecting means interposed co-axially in the path of the annular convergent beam and positioned so as to be impinged by the latter before it has focused to form a narrow annular image, the convergent reflecting means being operable to deflect the convergent annular beam whereby to form a single spot image on the axis of the annular beam.

In one embodiment, said optical means comprise means operable to form light emitted by the light source into an annular parallel beam of light and an annular converging lens mounted co-axially with and in the path of the annular parallel beam and operable to converge it into said convergent annular beam.

Preferably said means operable to form light emitted by the light source into an annular parallel beam of light comprise a paraboloidal reflector which has the light source at its focus. The present invention enables light to be collected and used more efficiently than where a simple converging lens is used in conjunction with such a paraboloidal reflector because light reflected from a greater annular surface area of the paraboloidal reflector can be used to form the annular parallel beam that is focused by the annular converging lens.

A mirror, especially a spherical section mirror, may be placed in the center of the annular converging lens and at a slight angle to the axis of the paraboloidal reflector to produce an image of the light source alongside the light source itself whereby to double the effective size of the light source.

In another embodiment said optical means operable to form light emitted by the light source into a convergent annular beam comprises an aspherical mirror arranged so that its reflecting surface has an annular concave form extending around an axis of rotational symmetry, the radial cross-section being that of an elliptical segment. The radially inner edges of the annular concave reflecting surface may coincide on the axis of the convergent annular beam or may be equispaced on either side thereof.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE INVENTION

Figure 1:
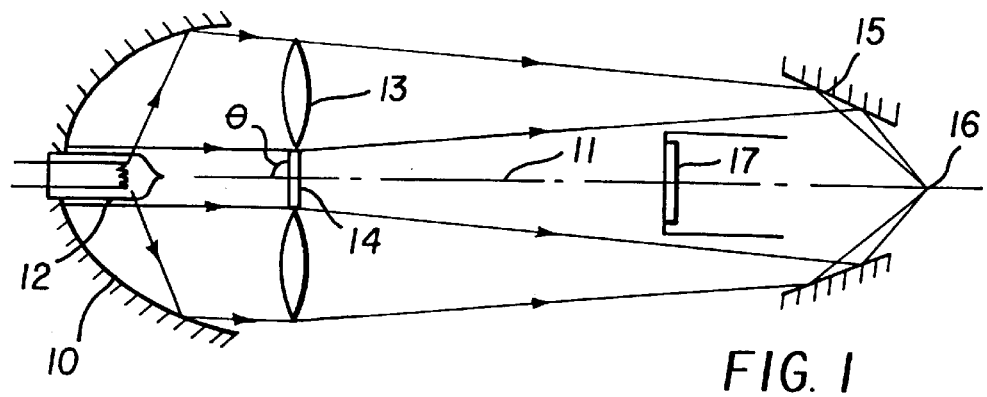
FIG. 1 is a diagrammatic illustration of one form of an optical system for reflection densitometry.

FIG. 1 shows the optical system comprises a paraboloidal reflector 10 having an axis 11, a lamp 12 mounted at its focus and a coaxial annular convex lens 13. The inside diameter of the annular lens 13 is equal to the diameter of the lamp 12 and the outside diameter of the lens 13 is equal to the diameter of the brim of the paraboloidal reflector 10. A parallel beam of light formed by reflection by the paraboloidal reflector 10 of light emitted by the lamp 12 is directed through the annular lens 13 as an annular convergent beam. A baffle 14 is placed in the center of the annular lens 13 to block light which does not pass through the lens 13.

An internally silvered conical mirror 15 is mounted coaxially in the path of the annular convergent beam between the annular lens 13 and the narrow ring image that would be formed by that convergent beam at the focus of the annular lens 13. The mirror 15 causes the convergent light beam to be deflected so that it converges to a small focused spot 16 on the axis 11 which would be a spot on the sample of which the reflectivity or reflection density is to be measured.

The light reflected by the mirror 15 forms a convergent narrow conical beam of light which makes an angle of 45°±5° with the axis 11.

A light detector 17 is mounted coaxially with the axis 11 adjacent the larger diameter end of the conical mirror 15 and is operable to detect the amount of light reflected perpendicularly from the sample that is illuminated by the spot 16 to give a measure of the reflectivity or reflection density of the material of the sample.

The use of the annular convex lens 13 and the internally silvered conical mirror 15 in combination means that the focal length of the convergent lens does not have to be small for conical illumination of a spot of the sample by light directed to it at approximately 45° to the axis 11 to be achieved.

According to FIG. 1, a spherical section mirror may be placed in the center of the annular lens 13 and at a slight angle θ to the axis 11 so that it produces an image of the filament of the lamp 12. Thus, light emanating from filament and passing through spherical section mirror 14 effectively doubles the diameter of the lamp 12 for emitting light.

Figure 2:
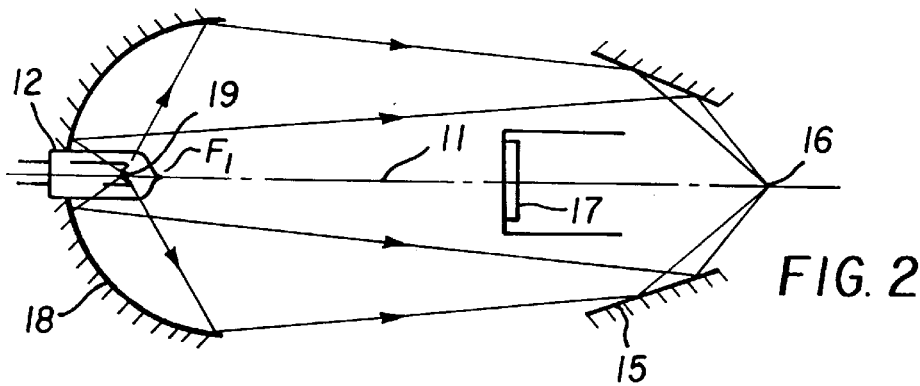
FIG. 2 is a diagrammatic illustration of another form of an optical system for reflection densitometry.
Figure 3:
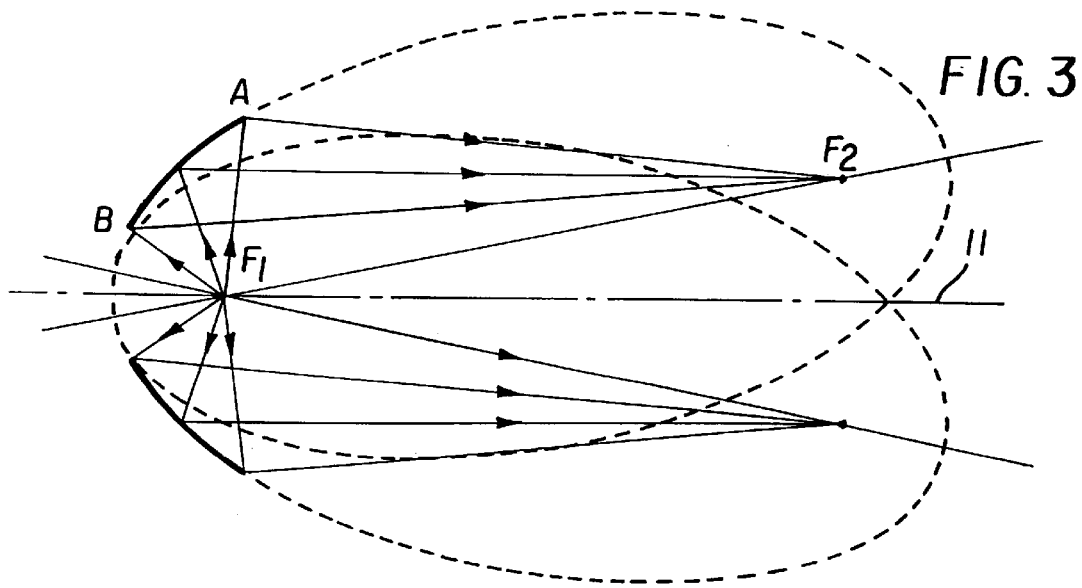
FIG. 3 illustrates the formation of the mirror used in the optical system illustrated in FIG. 2, and its operation.

FIG. 2 shows that the system described above with reference to and as illustrated in FIG. 1 can be modified to achieve the same end result by replacing the paraboloidal reflector 10 and the annular convex lens 13 by an aspherical mirror 18. The latter is formed by rotating a section of an ellipse, namely the section A-B shown in FIG. 3, through 360°, the major axis of the ellipse being inclined at an angle to the optical axis 11 of the system and having one of its foci, $F_1$, on that axis 11. Thus the mirror 18 has an annular concave form, the radial cross-section of which is part of an ellipse. The radially inner edge of the annular concave section of the mirror 18, namely the point B in FIG. 3, may be spaced from the axis 11 as shown in FIG. 3 to provide room for the lamp 12. Alternatively it may be on the axis 11.

FIG. 2 shows the lamp filament 19 is positioned at the focus $F_1$ of the ellipse. As can be seen in FIG. 3, focus $F_1$, is along the axis 11 of the ellipse 18. Light emitted by that filament 19 is reflected by the ellipse 18 and focused at the other focus $F_2$ of the ellipse as is shown in FIG. 3.

Light emitted by the lamp 12 is reflected by the mirror 18 to form a convergent annular beam symmetrically disposed around the axis 11. That beam is deflected by the conical mirror 15 as has been described above with reference to FIG. 1.

The invention has been described in detail with particular reference to certain preferred embodiments thereof, but it will be understood that variations and modifications can be effected within the spirit and scope of the invention.

PARTS LIST 10 paraboloidal reflector
11 axis
12 lamp
13 annular lens
14 baffle
15 conical mirror
16 spot
17 light detector
18 aspherical mirror
19 filament lamp

What is claimed is:

1. An optical system operable to focus an annular beam of light onto a spot, the system comprising a light source and optical means operable to form light emitted by the light source into a convergent annular beam directed along a path on an axis, said optical means comprising an aspherical mirror arranged so that its reflecting surface has an annular concave form extending around an axis of rotational symmetry, a radial cross-section of the annular concave form being that of an elliptical segment, further comprising convergent reflecting means interposed co-axially in the path of the annular convergent beam and positioned so as to be impinged by the annular convergent beam before the annular convergent beam has focussed to form a narrow annular image, the convergent reflecting means being operable to deflect the convergent annular beam whereby to form a single spot image on the axis of the annular beam.

* * * * *